United States Patent [19]

Miyakawa et al.

[11] 4,433,039
[45] Feb. 21, 1984

[54] TRISAZO ELECTROPHOTOGRAPHIC PHOTOSENSITIVE MATERIAL

[75] Inventors: Nobuhiro Miyakawa, Abiko; Teruaki Higashiguti, Tokyo; Yumiko Sano, Ibaragi; Masatomi Funato, Sakai, all of Japan

[73] Assignee: Mita Industrial Co. Ltd., Osaka, Japan

[21] Appl. No.: 420,875

[22] Filed: Sep. 21, 1982

[30] Foreign Application Priority Data

Nov. 2, 1981 [JP] Japan .................................. 56-174487

[51] Int. Cl.³ .............................................. G03G 5/06
[52] U.S. Cl. ......................................... 430/58; 430/72; 430/73; 430/75; 430/76; 430/78; 430/79; 260/152; 260/164; 260/165; 260/169
[58] Field of Search ........................ 430/58, 59, 72, 73, 430/75, 76, 78, 79; 260/152, 164, 165, 169

[56] References Cited

U.S. PATENT DOCUMENTS

| | | | |
|---|---|---|---|
| 1,785,845 | 12/1930 | Stuesser ............................. | 260/169 X |
| 1,913,382 | 6/1933 | Gubelmann et al. ............ | 260/169 X |
| 2,203,196 | 6/1940 | Hanhart ............................ | 260/169 X |
| 2,286,714 | 6/1942 | Chechak ........................... | 260/169 X |
| 4,169,831 | 10/1979 | Frank et al. ....................... | 260/169 X |
| 4,279,981 | 7/1981 | Ohta et al. ........................ | 430/58 X |
| 4,359,398 | 11/1982 | Cole et al. ........................ | 260/169 X |

Primary Examiner—Roland E. Martin, Jr.
Attorney, Agent, or Firm—Sherman & Shalloway

[57] ABSTRACT

Disclosed is an electrophotographic photosensitive material comprising a photosensitive layer containing a tris-azo pigment represented by the following formula:

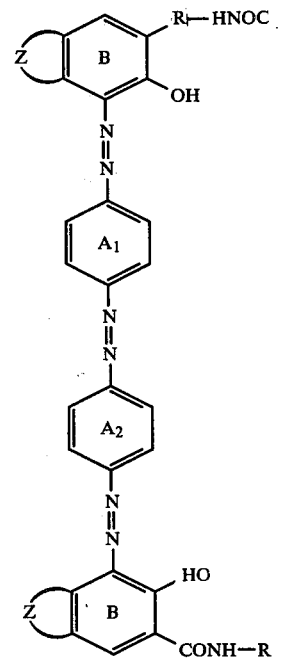

wherein the ring $A_1$ and $A_2$ may have a halogen atom, an alkyl group or alkoxy group as a substituent at the ortho-position to the azo group, Z stands for a benzene ring, naphthalene ring, indole ring, carbazole ring or benzofuran ring fused to the benzene ring B, and R stands for an unsubstituted or substituted phenyl, naphthyl or heterocyclic group.

This photosensitive material has a high sensitivity to rays in a broad wavelength region and is excellent in the resistance in the printing operation.

12 Claims, 1 Drawing Figure

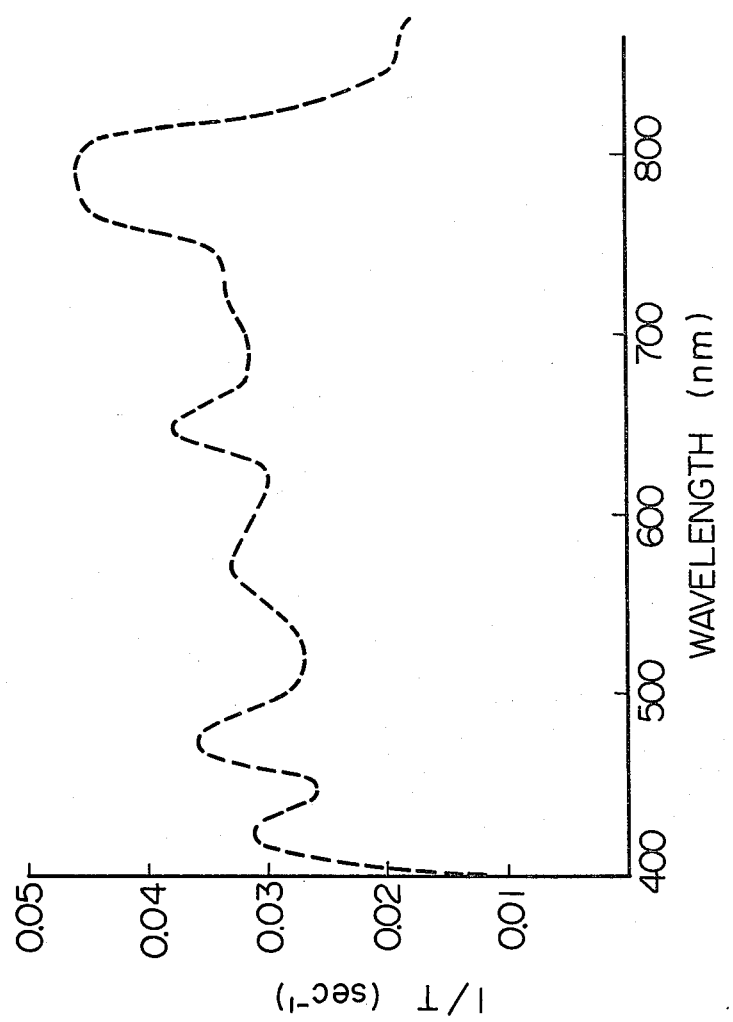

TRISAZO ELECTROPHOTOGRAPHIC PHOTOSENSITIVE MATERIAL

BACKGROUND OF THE INVENTION (1) Field of the Invention

The present invention relates to an improvement in an electrophotographic photosensitive material containing a tris-azo pigment in a photosensitive layer.

(2) Description of the Prior Art

It has been known from old that a dis-azo pigment is valuable as a photoconductive substance of an electrophotographic photosensitive material (see, for example, Japanese Patent Application Laid-Open Specification No. 37453/72). Furthermore, it has been known that a tris-azo pigment derived from triphenylmethane or an azoxy-bis(azobenzene) pigment can be used as a photoconductive pigment. In the field of electrophotographic reproduction, broadening of the sensitive wavelength region and increasing of the reproduction speed are always required, and development of a photoconductive pigment having a higher sensitivity and a broader sensitive wavelength region is always desired eagerly.

SUMMARY OF THE INVENTION

We found that a specific tris-azo pigment described in detail hereinafter has a broad sensitive wavelength region and an excellent fastness and is valuable as an organic photoconductive pigment. We have now completed the present invention based on this finding.

More specifically, in accordance with the present invention, there is provided an electrophotographic photosensitive material comprising a photosensitive layer containing a tris-azo pigment represented by the following formula:

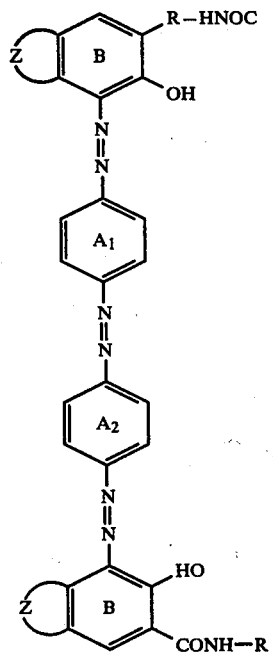

wherein the ring $A_1$ and $A_2$ may have a halogen atom, an alkyl group or alkoxy group as a substituent at the ortho-position to the azo group, Z stands for a benzene ring, naphthalene ring, indole ring, carbazole ring or benzofuran ring fused to take benzene ring B, and R stands for an unsubstituted or substituted phenyl, naphthyl or heterocyclic group.

BRIEF DESCRIPTION OF THE DRAWING

FIG. 1 illustrates the spectral sensitivity of an electrophotographic photosensitive material comprising an azo pigment synthesized in Synthesis Example 1, in which T represents a half-decay exposure time.

DETAILED DESCRIPTION OF THE PREFERRED EMBODIMENTS

The tris-azo pigment that is used in the present invention has a structure formed by coupling an azobenzene tetrazonium salt represented by the following formula:

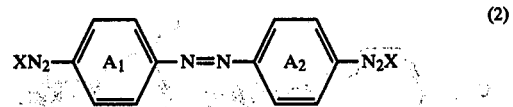

(2)

wherein the ring $A_1$ and $A_2$ are as defined above, and X stands for an anion, with an azo coupling component represented by the following formula:

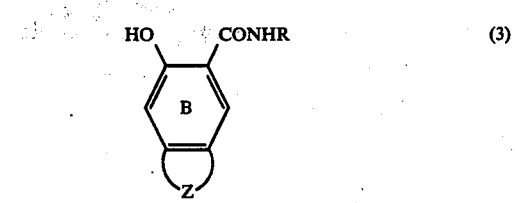

(3)

wherein B, Z and R are as defined above.

This tris-azo pigment is characterized in that it has a spectral sensitivity in the wavelength region of 400 to 900 μm and has an especially high sensitivity to near infrared rays and infrared rays. Accordingly, an electrophotographic photosensitive material containing this triz-azo pigment can be used very valuably not only as a photosensitive material for ordinary electrophotographic reproduction and printing but also as a photosensitive material for a laser printer. Moreover, this tris-azo pigment has a very high fastness to radiation, discharge and ozone and can provide a photosensitive material excellent in the resistance to the printing operation.

As preferred examples of the azobenzene tetrazonium salt of the formula (2), the following compounds can be mentioned, though compounds that can be used are not limited to those exemplified below:

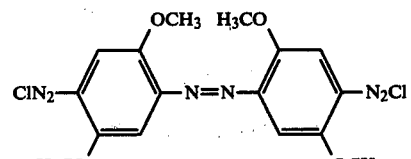

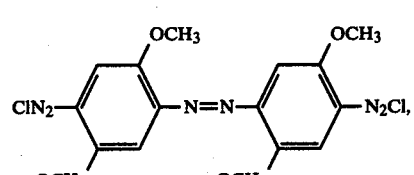

-continued
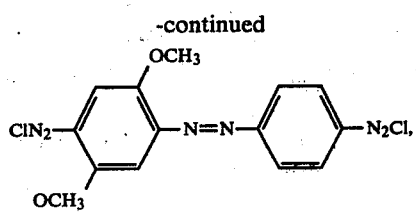
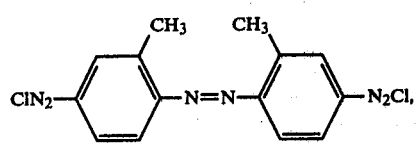
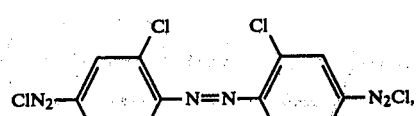
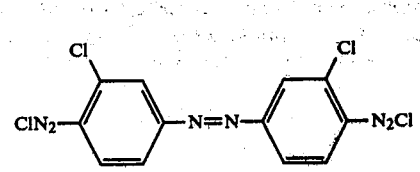
and
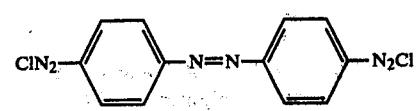
As preferred examples of the coupling component of the formula (3), the following compounds can be mentioned, though compounds that can be used are not limited to those exemplified below.
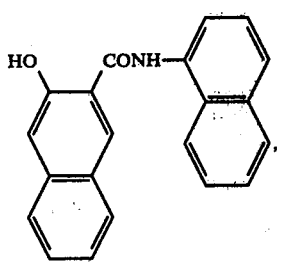
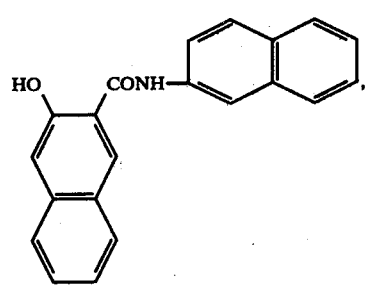
-continued
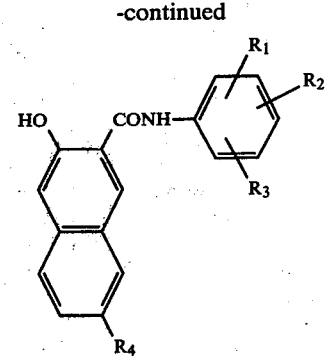
wherein $R_1$, $R_2$ and $R_3$ stand for —H, —$CH_3$, —$OCH_3$, —$OC_2H_5$, —$NO_2$, —Cl or —Br, and $R_4$ stands for —H, —Cl or —Br,
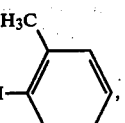
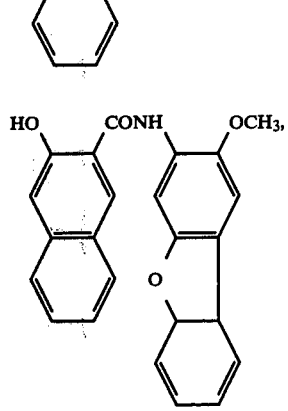
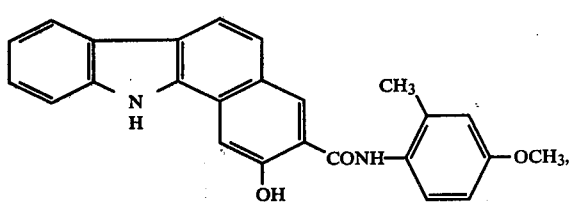
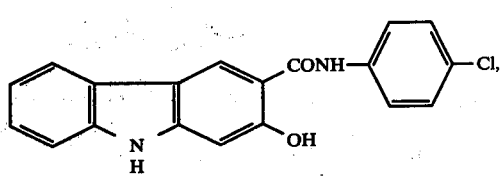

-continued

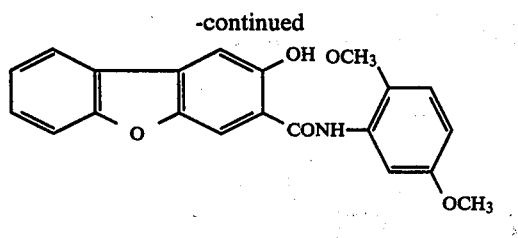

and

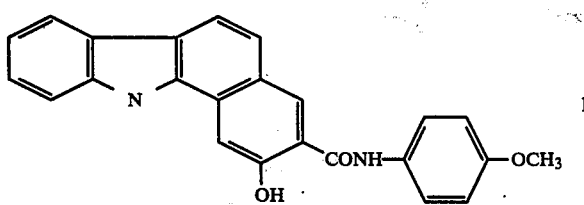

The tris-azo pigment that is used in the present invention can easily be obtained by coupling a tetrazonium salt of the formula (2) with an azo coupling component of the formula (3) in the presence of an alkaline substance in an appropriate organic solvent, for example, dimethylformamide.

The tris-azo pigment may be used in various modes for the electrophotographic photosensitive material of the present invention, if the condition that the tris-azo pigments should be contained in the photosensitive layer is satisfied. For example, this tris-azo pigment is dispersed as a photoconductive pigment in an electrically insulating binder medium and the resulting composition is coated as a photoconductive layer on an electrically conductive substrate. It is preferred that the tris-azo pigment be finely dispersed so that the particle size of the dispersed pigment is less than 5 microns, especially less than 2 microns. In this embodiment, as the electrically insulating binder medium, there can be used a polyester resin, an acrylic resin, a styrene resin, an epoxy resin, a polycarbonate resin, a silicone resin, an alkyd resin and a vinyl chloride/vinyl acetate copolymer. It is preferred that the tris-azo pigment be used in an amount of 5 to 100 parts by weight, especially 10 to 50 parts by weight, per 100 parts by weight of the binder medium. As the electrically conductive substrate, there can be used a metal substrate in the form of a sheet or drum or a paper subjected to an electrically conducting treatment. It is preferred that the amount coated of the photoconductive layer be 3 to 20 g/m², especially 5 to 10 g/m², as the dry layer.

In accordance with another embodiment of the present invention, the tris-azo pigment is dispersed as a charge-generating pigment in a charge-transporting substance and the resulting dispersion composition is coated as a photosensitive layer on an electrically conductive substrate. Any of known hole-transporting substances and electron-transporting substances can be used as the charge-transporting substance in the present invention. As preferred examples of the hole-transporting substance, there can be mentioned poly-N-vinylcarbazole, phenanthrene, N-ethylcarbazole, 2,5-diphenyl-1,3,4-oxadiazole, 2,5-bis-(4-diethylaminophenyl)-1,3,4-oxadiazole, bis-diethylaminophenyl-1,3,6-oxadiazole, 4,4'-bis(diethylamino-2,2'-dimethyltriphenyl)methane, 2,4,5-triaminophenylimidazole, 2,5-bis(4-diethylaminophenyl)-1,3,4-triazole, 1-phenyl-3-(4-diethylaminostyryl)-5-(4-diethylaminophenyl)-2-pyrazoline and p-diethylaminobenzaldehydo-(diphenylhydrazone). As preferred examples of the electron-transporting substance, there can be mentioned 2-nitro-9-fluorenone, 2,7-dinitro-9-fluorenone, 2,4,7-trinitro-9-fluorenone, 2,4,5,7-tetranitro-9-fluorenone, 2-nitrobenzothiophene, 2,4,8-trinitrothioxanthone, dinitroanthene, dinitroacridine, dinitroanthraquinone and tetracyanoquinodimethane. These compounds may be used singly or in the form of a mixture of two or more of them. Of course, there may be adopted a method in which a complex of an electron receptor and an electron donor is used as the charge-transporting substance so that both the holes and electrons can be transported.

In the case where the charge-transporting substance is a low-molecular-weight substance, it is necessary that the charge-transporting substance should be used in the state dispersed in a binder resin such as mentioned above, and in the case where the charge-transporting substance is a high-molecular-weight substance having a binding property, in order to increase the mechanical properties and enhance the adhesion, it is preferred that a binder resin such as mentioned above be used in combination with the charge-transporting substance.

In this embodiment of the present invention, it is preferred that the tris-azo pigment be used in an amount of 1 to 30 parts by weight, especially 2 to 20 parts by weight, per 100 parts by weight of the whole photosensitive layer.

In accordance with still another embodiment of the present invention, a charge-generating layer containing the tris-azo pigment is formed on an electrically conductive substrate, and a charge-transporting layer is formed on this charge-generating layer. The charge-generating layer can be formed by vacuum-depositing the tris-azo pigment on the substrate or by coating a dispersion of the tris-azo pigment in an appropriate organic solvent on the substrate and drying the coated dispersion. Furthermore, a dispersion of the tris-azo pigment in a binder resin may be coated on the electrically conductive substrate as in the above-mentioned first embodiment. The charge-transporting layer can easily be formed by coating the charge-transporting substance described in detail in the second embodiment. The thickness of the charge-generating layer may be changed in the range of from 0.1 micron in case of vacuum deposition to 3 microns in case of coating of the resin-pigment dispersion, and it is preferred that the thickness of the charge-transporting layer be 5 to 30 microns.

The tris-azo pigment that is used in the present invention has an especially excellent sensitivity when it is used for the photosensitive layer of the third embodiment, that is, the function-separated type photosensitive layer including the charge-generating layer and the charge-transporting layer.

The electrophotographic photosensitive material of the present invention is effectively used for the electrophotographic process in which the photosensitive layer is subjected to positive or negative corona discharge to electrically charge the surface of the photosensitive layer and the charged surface of the photosensitive layer is subjected to imagewise light exposure to form an electrostatic latent image. The electrophotographic photosensitive materials of the above-mentioned first and second embodiments of the present invention are advantageously used for the positive charging, while the electrophotographic photosensitive material of the third embodiment of the present invention is advantageously used for the negative charging.

and pulverization were carried out to obtain 45 parts of the following tris-azo pigment.

Azo Pigment No. 1:

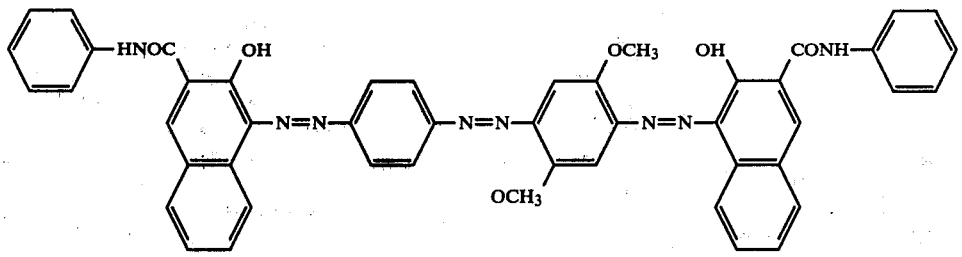

The present invention will now be described in detail with reference to the following Examples that by no means limit the scope of the invention.

Incidentally, all of "parts" and "%" in the Examples are by weight.

SYNTHESIS EXAMPLE 1

A solution was prepared by mixing 19 parts of 4,4'-diamino-2,5-dimethoxyazobenzene with 54 parts of 35% hydrochloric acid and 260 parts of water, and an aqueous solution containing 12.7 parts of sodium nitrite was poured into the so-formed solution under cooling below 15° C. to effect tetrazotization. The reaction mixture was filtered, and the filtrate was poured into an aqueous solution comprising 36.8 parts of 3-hydroxy-2-naphthoanilide, 23 parts of 48% sodium hydroxide and 1500 parts of water, and coupling reaction was carried out at about 25° C. Just before completion of the reaction, the pH value was adjusted to a weakly acidic level by addition of dilute hydrochloric acid, and the reaction product was aged under heating. After completion of the reaction, filtration, water washing, drying (100° C.)

SYNTHESIS EXAMPLE 2

A solution was prepared by mixing 10.6 parts of 4,4'-diaminobenzene with 44.2 parts of 35% hydrochloric acid and 200 parts of water, and an aqueous solution containing 7.6 parts of sodium nitrite was dropped into the above solution under cooling below 10° C. to effect tetrazotization. The reaction mixture was filtered, and the filtrate was dropped into a homogeneous solution comprising 31.3 parts of 3-hydroxy-2-naphtho-2-naphthalide, 120 parts of methanol, 28.9 parts of 48% sodium hydroxide and 800 parts of warm water, and coupling reaction was carried out about 30° C. Just before completion of the reaction, the pH value was adjusted to a weakly acidic level by addition of dilute hydrochloric acid, and the reaction product was aged under heating. After completion of the reaction, filtration, water washing, drying (100° C.) and pulverization were carried out to obtain 31 parts of the following tris-azo pigment.

Azo Pigment No. 2:

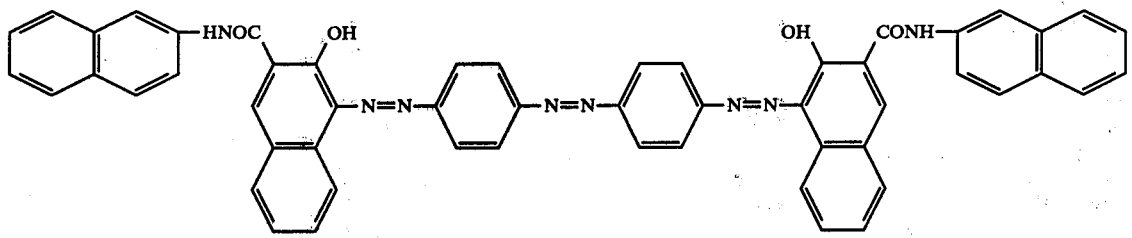

Tris-azo pigments described below were synthesized in the same manner as described in Synthesis Example 1 or 2.

| Structural Formula | Azo Pigment No. |
|---|---|
|  | 3. |
|  | 4 |

| Structural Formula | Azo Pigment No. |
|---|---|
| 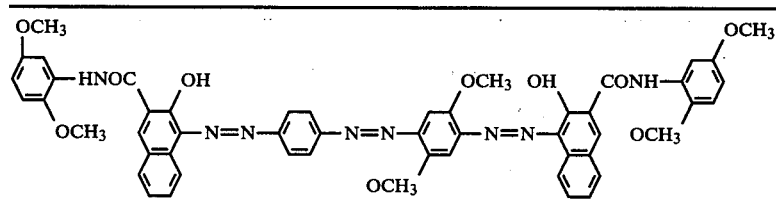 | 5 |
| 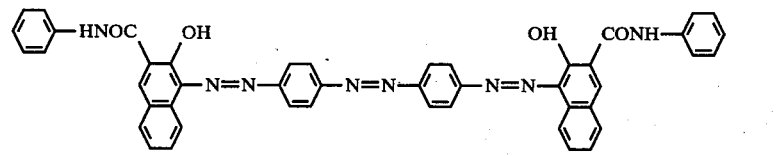 | 6 |
| 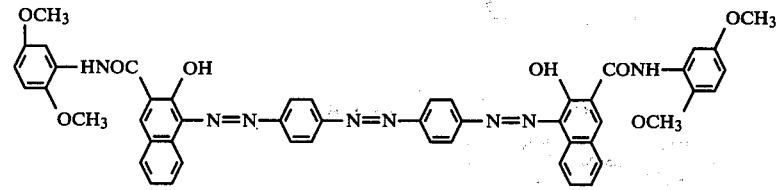 | 7 |
| 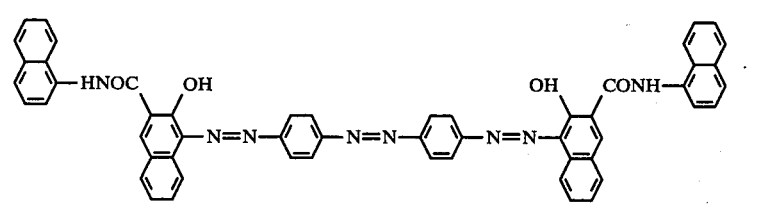 | 8 |
| 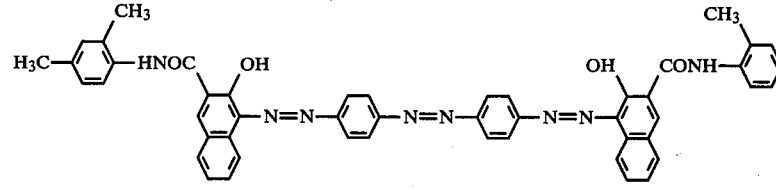 | 9 |
| 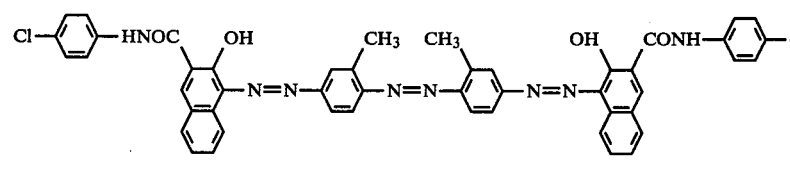 | 10 |
| 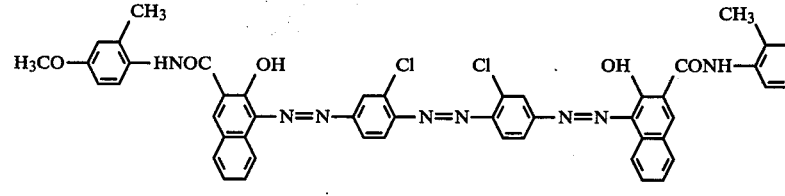 | 11 |
| 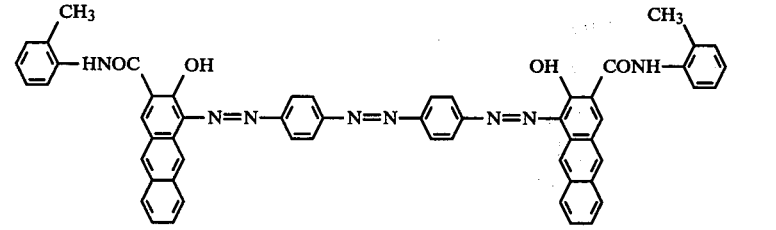 | 12 |

-continued
| Structural Formula | Azo Pigment No. |
|---|---|
| 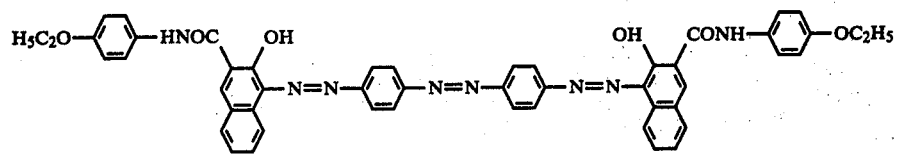 | 13 |
| 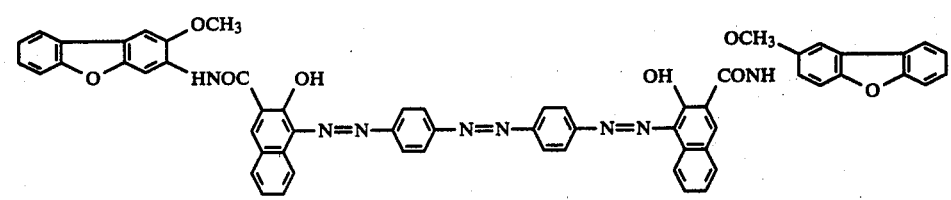 | 14 |
| 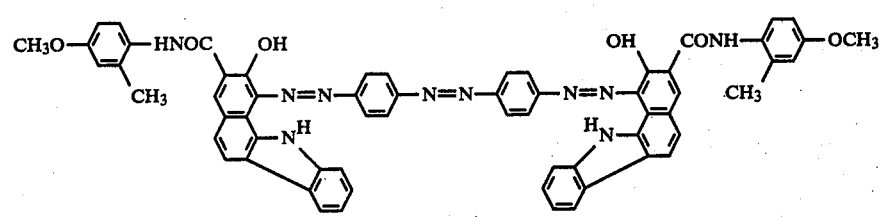 | 15 |
| 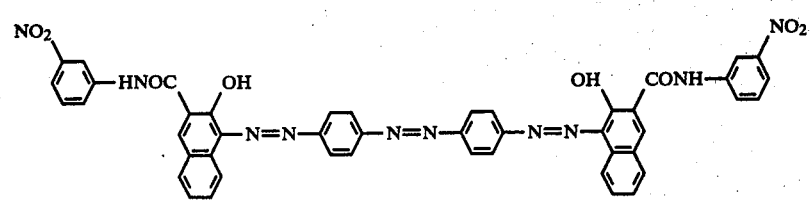 | 16 |
| 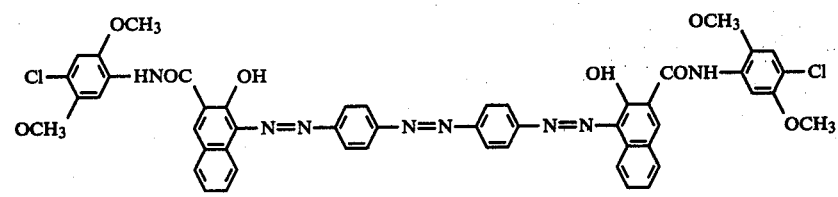 | 17 |
| 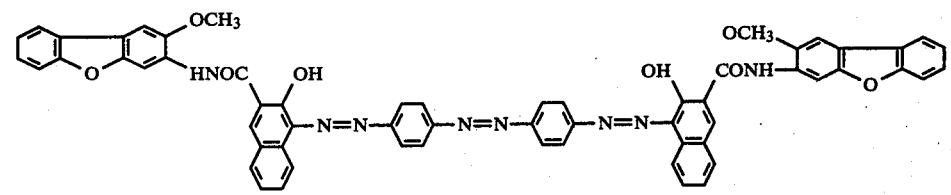 | 18 |
| 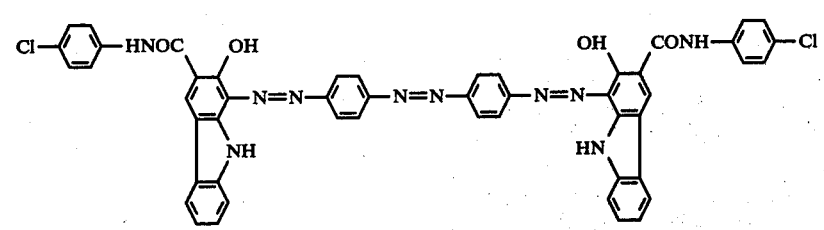 | 19 |

| Structural Formula | Azo Pigment No. |
|---|---|
| (structure with OCH₃ groups, HNOC, OH, N=N linkages, CONH, OCH₃) | 20 |

EXAMPLE 1

In a ball mill, 2 parts of the azo pigment of Synthesis Example 1, 6 parts of a polyester resin (Vylon 200 supplied by Toyobo) and 65 parts of tetrahydrofuran (hereinafter referred to as "THF") were mixed and pulverized to form a coating liquid.

This coating liquid was coated on an aluminum foil having a thickness of 100μ by a wire bar, and the coating was dried at 100° C. for 30 minutes to obtain an electrophotographic photosensitive material comprising a coating layer having a thickness of 4.7μ. The photosensitive material was allowed to stand in the dark for 6 hours to form a sample for determination of the spectral sensitivity. The sample was subjected to corona discharge to produce a surface potential of about +350 V, and the surface of the sample was exposed to a constant-energy monochromatic light at a light-receiving intensity of 5.7 $\mu W/cm^2$ and the time T required for the surface potential to be reduced to ½ (half-decay light exposure time) was measured with respect to each wavelength.

Reciprocal numbers of the measured times T were plotted with respect to each wavelength to determine the spectral sensitivity. The results are shown in FIG. 1, from which it will readily be understood that the photosensitive material has a good spectral sensitivity to near infrared rays and infrared rays.

As the spectroscope emitting a constant-energy monochromatic light, there was used a spectroscope Model SS-50 supplied by Nippon Bunko, and as the surface potential meter, there was used a device constructed by modifying a surface potential meter Model SP-428 supplied by Kawaguchi Denki.

EXAMPLE 2

Photosensitive materials were prepared by using the azo pigments Nos. 4, 5 and 6 in the same manner as described in Example 1, and these photosensitive materials were tested in the following manner.

The photosensitive material was charged by positive or negative corona discharge, and the photosensitive material was closely contacted with a positive original (having an image formed on a transparent film) in the state where the surface illuminance of the photosensitive material was 80 luxes, and the light exposure was carried out for 1 to 2 seconds. Then, development was carried out by a negative or positive two-component type developer (developer DC-161 or DC-15 supplied by Mita Industrial Co., Ltd.), and the developed image was transferred onto a plain paper (bond paper having a thickness of 90μ) and was thermally fixed.

In each photosensitive material, a fog-free copy having a high contrast and fidelity was obtained.

EXAMPLE 3

A coating liquid formed by mixing and pulverizing 3 parts of a tris-azo pigment shown in Table 1, 30 parts of 2,4,7-trinitrofluorenone, 30 parts of a polyester resin and 190 parts of THF in a ball mill was coated and dried in the same manner as in Example 1 to form an electrophotographic photosensitive material having a coating layer thickness of 7.5μ. Charging characteristics were determined to obtain results shown in Table 1.

TABLE 1

| Azo Pigment No. | Surface Potential (V) | Half-Decay Light Exposure Quantity (lux · sec) |
|---|---|---|
| 2 | −920 | 7.2 |
| 3 | −910 | 8.0 |
| 7 | −880 | 6.3 |
| 10 | −970 | 7.5 |
| 11 | −900 | 7.4 |
| 15 | −850 | 9.8 |
| 18 | −930 | 8.0 |
| 20 | −915 | 7.9 |

It is seen that each photosensitive material has high potential and high sensitivity.

EXAMPLE 4

Photosensitive materials were prepared in the same manner as in Example 1 by mixing and pulverizing 3 parts of a tris-azo pigment shown in Table 2, 30 parts of p-diethylaminobenzaldehydo-(diphenylhydrazone), 30 parts of a polyester resin and 190 parts of THF. Charging characteristics of these photosensitive materials were determined to obtain results shown in Table 2.

TABLE 2

| Azo Pigment No. | Surface Potential (V) | Half-Decay Light Exposure Quantity (lux · sec) |
|---|---|---|
| 1 | +480 | 6.4 |
| 2 | +490 | 4.6 |
| 4 | +400 | 4.8 |
| 6 | +420 | 5.6 |
| 9 | +470 | 5.1 |

It is seen that each photosensitive material has good chargeability and high sensitivity.

It was confirmed that 2,5-bis-(4-diethylaminophenyl)-1,3,4-oxadiazole, 1-phenyl-3-(4-diethylaminostyryl)-5-(4-diethylaminophenyl)-2-pyrazoline and 4,4'-benzylidene-bis(N,N-diethyl-m-toluidine) can similarly be used effectively as the hole-transporting substance.

EXAMPLE 5

In a ball mill, 5 parts of a tris-azo pigment shown in Table 3 was pulverized in 100 parts of THF, and the resulting dispersion was coated on an aluminum foil by a wire bar and naturally dried to form a charge-generating layer having a thickness of 0.5μ. Then, a solution comprising 4.5 parts of p-diethylaminobenzaldehydo-(diphenylhydrazone), 4.5 parts of a polyester resin and 26 parts of THF was coated on the charge-generating layer by a doctor blade and was dried at 100° C. for 30 minutes to form a hole-transporting layer.

The photosensitive material was allowed to stand in the dark for 2 hours, and charging characteristics were determined to obtain results shown in Table 3.

TABLE 3

| Azo Pigment No. | Surface Potential (V) | Half-Decay Light Exposure Quantity (lux · sec) |
|---|---|---|
| 1 | −600 | 4.6 |
| 2 | −720 | 5.6 |
| 4 | −590 | 4.8 |
| 6 | −680 | 5.0 |
| 9 | −700 | 4.8 |

It is seen that each photosensitive material has good chargeability and high sensitivity.

It was confirmed that 2,5-bis-(4-diethylaminophenyl)-1,3,4-oxadiazole, 1-phenyl-3-(4-diethylaminostyryl)-5-(4-diethylaminophenyl)-2-pyrazoline and 4,4′-benzylidene-bis(N,N-diethyl-m-toluidine) can similarly be used effectively as the hole-transporting substance.

What is claimed is:

1. An electrographic photosensitive material which comprises an electrically conductive substrate and a photosensitive layer, wherein the photosensitive layer comprises a charge-generating layer containing a tris-azo pigment, which is formed on said electrically conductive substrate, said tris-azo pigment being a compound represented by the following formula:

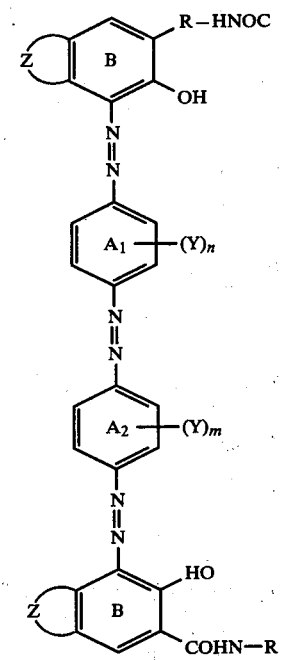

wherein Y is a halogen atom, an alkyl group or alkoxy group as a substituent at the ortho-position to the azo group, n is 0, 1 or 2, m is 0, 1 or 2, Z is a benzene ring, naphthalene ring, indole ring, carbazole ring or benzofuran ring fused to the benzene ring B, and R is an unsubstituted or substituted phenyl, naphthyl or benzofuran group; dispersed in an electrically insulating binder, and a layer of a charge-transporting substance formed on the charge-generating layer.

2. An electrophotographic photosensitive material comprising an electrically conductive substrate and deposited thereon a photosensitive layer containing a tris-azo pigment represented by the following formula:

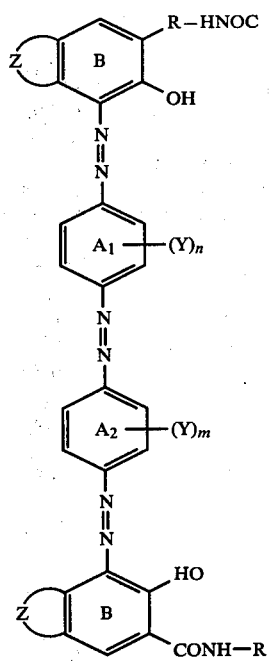

wherein Y is a halogen atom, an alkyl group or alkoxy group as a substituent at the ortho-position to the azo group, n is 0, 1 or 2, m is 0, 1 or 2, Z is a benzene ring, naphthalene ring, indole ring, carbazole ring or benzofuran ring fused to the benzene ring B, and R is an unsubstituted or substituted phenyl, naphthyl or benzofuran group; dispersed in an electrically insulating binder.

3. A photosensitive material as set forth in claim 1, wherein the tris-azo pigment is present in an amount of 5 to 100 parts by weight per 100 parts by weight of the binder.

4. An electrophotographic photosensitive material comprising an electrically conductive substrate and a photosensitive layer deposited thereon wherein the photosensitive layer is a photosensitive material formed by dispersing a tris-azo pigment as a charge-generating pigment in a charge-transporting substance wherein said tris-azo pigment is represented by the following formula:

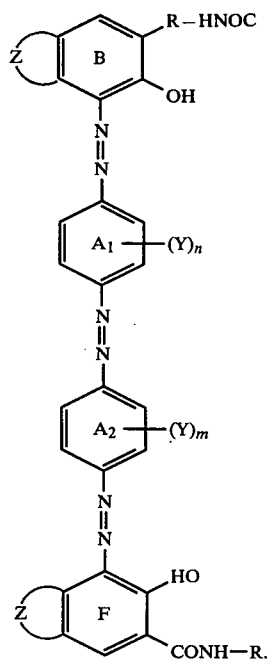

wherein Y is a halogen atom, an alkyl group or alkoxy group as a substituent at the ortho-position to the azo group, n is 0, 1 or 2, m is 0, 1 or 2, Z is a benzene ring, naphthalene ring, indole ring, carbazole ring or benzofuran ring fused to the benzene ring B, and R is an unsubstituted or substituted phenyl, naphthyl or benzofuran group; dispersed in an electrically insulating binder.

5. A photosensitive material as set forth in claim 4, wherein the tris-azo pigment is present in an amount of 1 to 30 parts by weight per 100 parts by weight of the whole photosensitive layer.

6. A photosensitive material as set forth in claim 1, wherein the charge-generating layer has a thickness of 0.1 to 3 microns and the charge-transporting layer has a thickness of 5 to 30 microns.

7. The photosensitive material of claim 2 wherein said tris-azo pigment is selected from the group consisting of

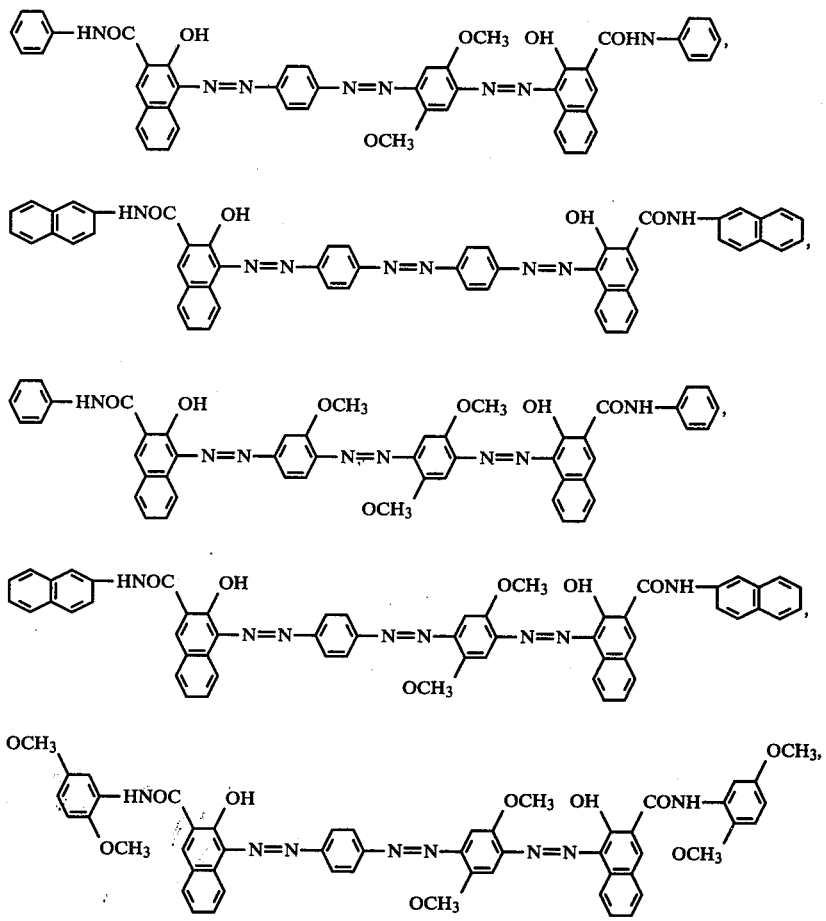

-continued
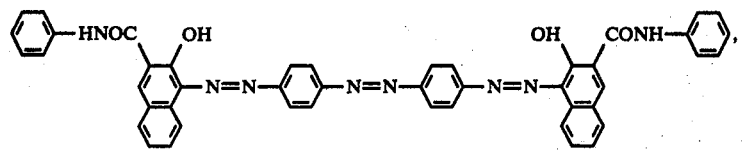
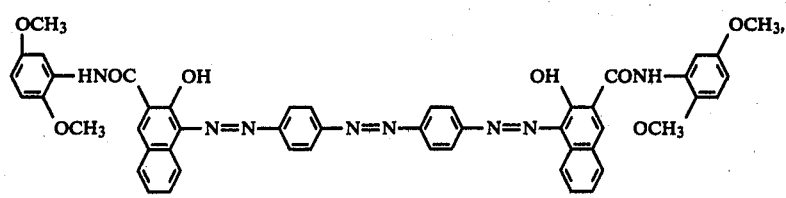
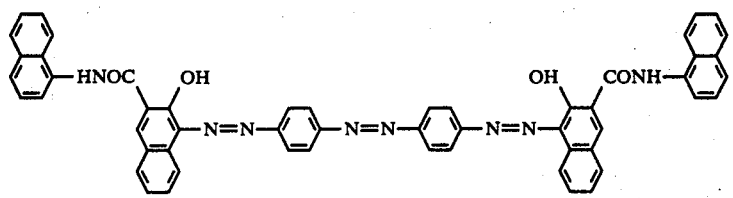
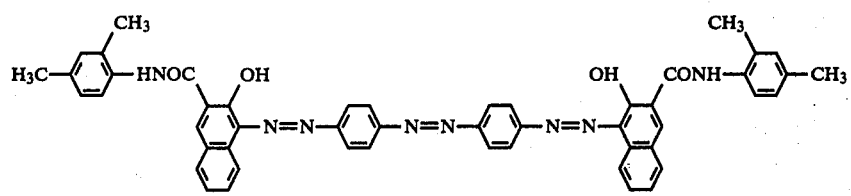
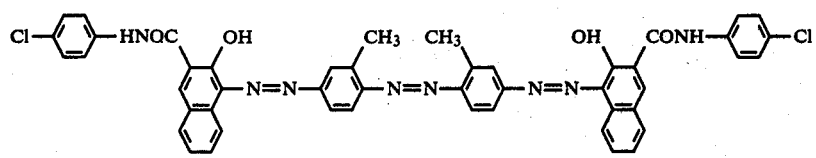
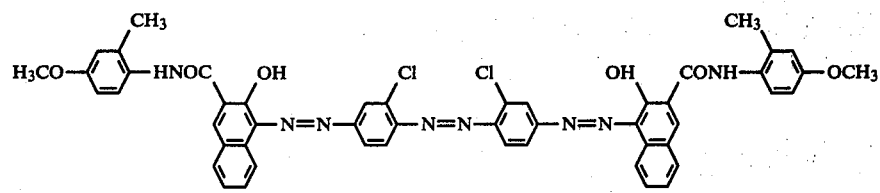
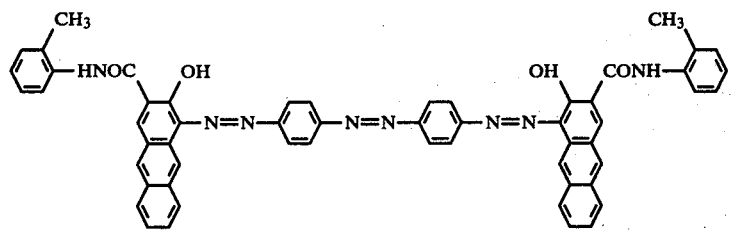
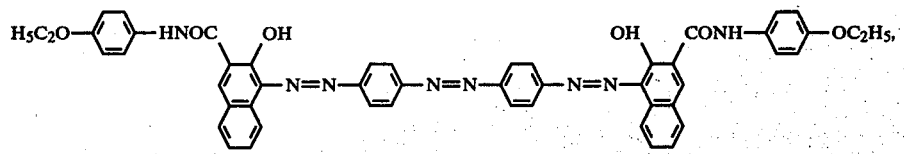

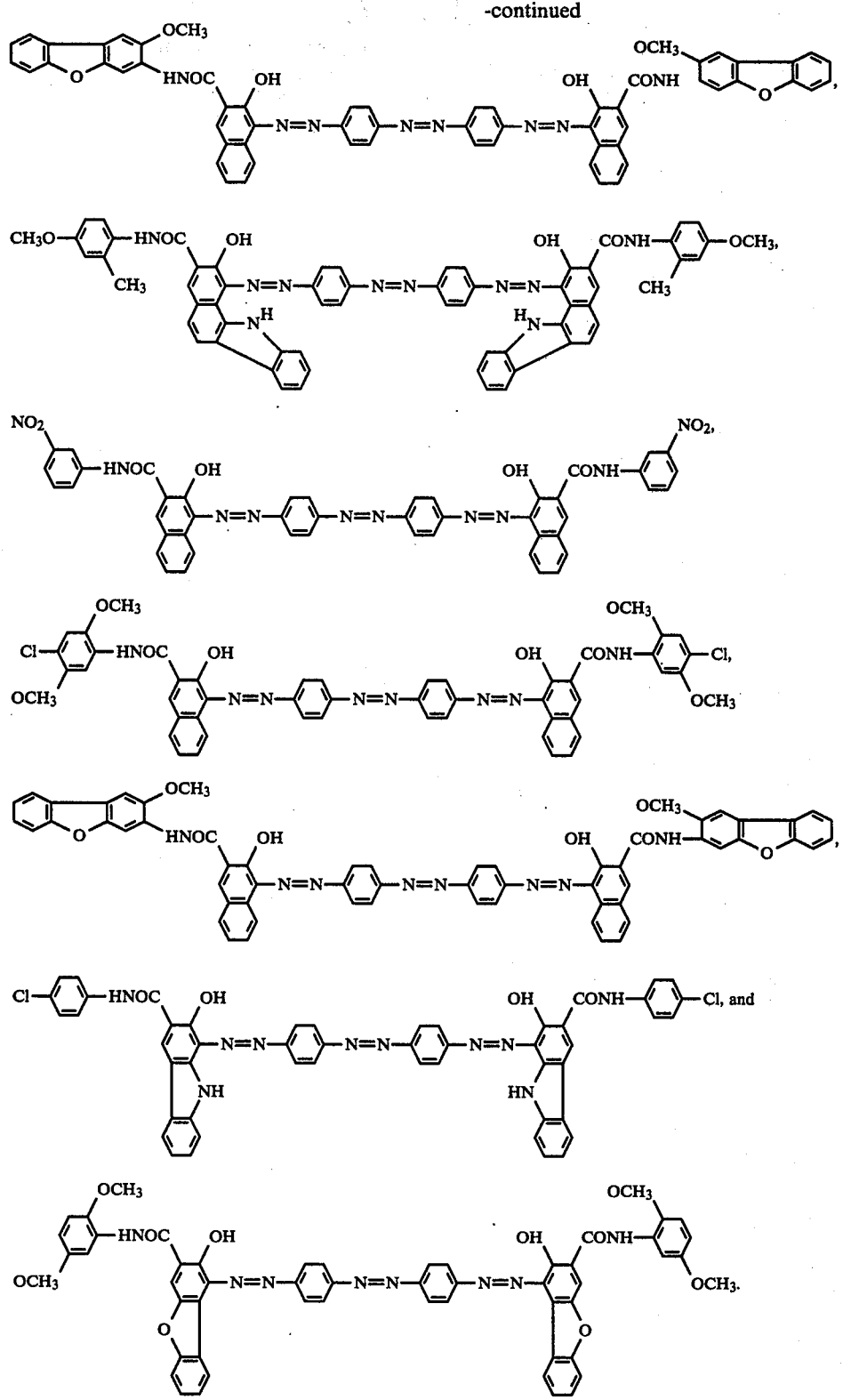

8. The photosensitive material of claim 2 wherein said tris-azo pigment has a particle size of less than 5 microns and is present in an amount of from 10 to 50 parts by weight, per 100 parts by weight of the binder.

9. The photosensitive material of claim 4 wherein the tris-azo pigment is present in an amount of 2 to 20 parts by weight, per 100 parts by weight of the whole photosensitive layer.

10. The photosensitive material of claim 1 wherein the charge-generating layer is formed by vacuum-depositing the tris-azo pigment on the electrically conductive substrate.

11. The photosensitive material of claim 1 wherein the charge-generating layer is formed by coating a dispersion of the tris-azo pigment in an organic solvent on the electrically conductive substrate and drying the coated dispersion.

12. The photosensitive material of claim 1 wherein the charge-generating layer comprises a dispersion of the tris-azo pigment in an electrically insulating binder.

* * * * *

UNITED STATES PATENT AND TRADEMARK OFFICE
CERTIFICATE OF CORRECTION

PATENT NO. : 4,433,039

DATED : February 21, 1984

INVENTOR(S) : Nobuhiro Miyakawa et al.

It is certified that error appears in the above-identified patent and that said Letters Patent is hereby corrected as shown below:

In the Abstract, the formula should read:

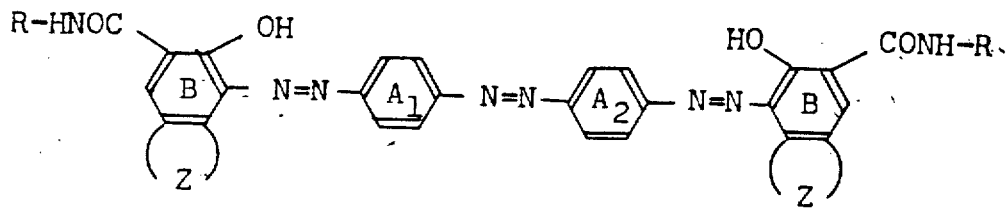

Column 15, Claim 1, the formula should read:

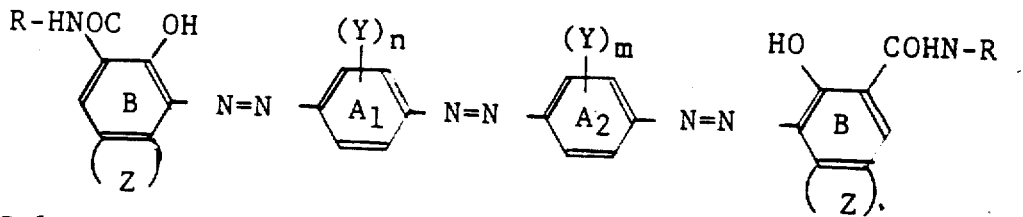

Column 16, Claim 2, the formula should read:

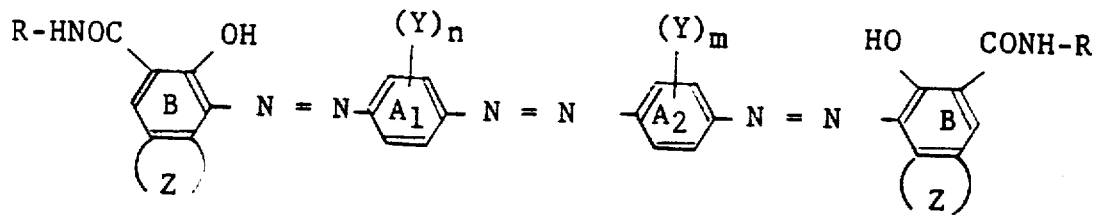

UNITED STATES PATENT AND TRADEMARK OFFICE
CERTIFICATE OF CORRECTION

PATENT NO. : 4,433,039
DATED : February 21, 1984
INVENTOR(S) : Nobuhiro Miyakawa et al.

It is certified that error appears in the above-identified patent and that said Letters Patent is hereby corrected as shown below:

Column 17, Claim 4, the formula should read:

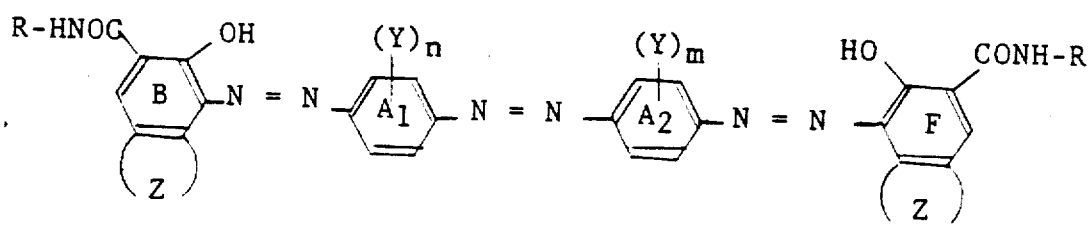

Signed and Sealed this

Twelfth Day of March 1985

[SEAL]

Attest:

DONALD J. QUIGG

Attesting Officer      Acting Commissioner of Patents and Trademarks